United States Patent [19]

Morita et al.

[11] Patent Number: 5,256,471
[45] Date of Patent: Oct. 26, 1993

[54] COMPOSITE POLYESTER FILM

[75] Inventors: Tohru Morita, Tagata; Akihiko Nagahama, Mishima; Toshiaki Ueda, Mishima; Masaaki Ono, Mishima, all of Japan

[73] Assignee: Toray Industries, Inc., Japan

[21] Appl. No.: 689,847

[22] PCT Filed: Sep. 25, 1990

[86] PCT No.: PCT/JP90/01233

§ 371 Date: May 23, 1991

§ 102(e) Date: May 23, 1991

[87] PCT Pub. No.: WO89/09586

PCT Pub. Date: Oct. 19, 1989

[30] Foreign Application Priority Data

Sep. 27, 1989 [JP] Japan .................................. 1-256029

[51] Int. Cl.⁵ ...................... B32B 27/36; B29C 47/88; G11B 5/704; B29K 67/00
[52] U.S. Cl. ..................................... 428/213; 264/22; 425/174.8 E; 428/323; 428/327; 428/330; 428/480
[58] Field of Search ............... 428/327, 330, 480, 213, 428/323; 264/22; 425/174.8 E

[56] References Cited

U.S. PATENT DOCUMENTS

| | | | |
|---|---|---|---|
| 3,900,653 | 8/1975 | Riboulet et al. | 428/480 |
| 4,111,625 | 9/1978 | Remmington et al. | 425/404 |
| 4,198,458 | 4/1980 | Mitsuishi et al. | 428/480 |
| 4,255,516 | 3/1981 | Katoh et al. | 428/480 |
| 4,478,772 | 10/1984 | Takagi et al. | 264/22 |
| 4,990,400 | 4/1991 | Endo et al. | 428/480 |

Primary Examiner—Paul J. Thibodeau
Assistant Examiner—D. S. Nakarani
Attorney, Agent, or Firm—Austin R. Miller

[57] ABSTRACT

A composite polyester film in the present invention comprises a main layer and a sublayer. The polyester comprising the sublayer has a specific resistance of the polymer in a melt state of less than $5 \times 10 \Omega \cdot cm$. The specific resistance of the polymer in a melt state is lower than that of the polyester constituting the main layer. In addition, the thickness of the sublayer is 1/200 to 4/10 of the overall thickness of the composite film.

The composite polyester film has excellent electrostatic impression casting property and thermal stability.

14 Claims, 1 Drawing Sheet

Fig. 1

COMPOSITE POLYESTER FILM

DESCRIPTION

1. Technical Field

This invention relates to a composite polyester film and particularly to a composite polyester film having excellent electrostatic impression casting property and thermal stability.

2. Background Art

Polyester such as polyethylene terephthalate and the like is excellent in mechanical characteristics, thermal resistance, weather-proof and electrical insulation properties. Polyester has been broadly used as film and for molding articles.

Preferable film forming productivity, uniform thickness and excellent transparency have been needed for polyester film. Normally, polyester film is produced by quenching a melt-extruded polyester sheet with a rotating quenching drum or the like. The polyester sheet is, however, difficult to adhere to the surface of the quenching drum so that uniform film is not readily obtained. There have been proposed a variety of methods of improving the adherence of polyester sheet. For instance, there has been proposed a method in which a polyester sheet is made adherent to a quenching drum by forming an electrode between an extrusion die and the quenching drum, and subsequently applying a high voltage to unsolidified polyester sheet in order to adhere the polyester sheet to the quenching drum (hereinafter referred to as an electrostatic impression casting method) (Japanese Patent Publication No.37-6142). When the film forming rate is increased, this electrostatic impression casting method causes a problem of decreasing adherence between the sheet and the quenching drum.

In order to solve such a problem, there has been proposed a method of decreasing the specific resistance of the polyester by adding metal compounds to the polyester (Japanese Patent Application Laid-Open Specifications Nos. 53-34894, 57-190040 etc.). The film containing such compound has a uniform thickness but has decreased thermal stability. The decrease of thermal stability results in the formation of coarse protrusions derived from polymer gel formed by thermal degradation and the metal compounds. There arises a problem of increasing defects (fish eyes) on the surface of the film after stretching. Furthermore, these coarse protrusions cause a problem of decreasing insulation breakdown voltage for use of the polyester in capacitors.

On the other hand, in order to improve the slipperiness of polyester film, there have been proposed numerous methods of adding inorganic particles to the polyester. In these methods, not only the electrostatic impression casting property but also uniformity of the protrusions formed on the film surface by inorganic particles are insufficient (Japanese Patent Application Laid-Open Specification No. 59-171623 etc.).

The inventors have found that the electrostatic impression casting property is influenced by the quantity of metal present in the region of the surface of the melt polyester sheet which is in contact with the rotating quenching drum, which through extensive research, has led to the present invention.

The object of the invention is to provide a composite polyester film having excellent electrostatic impression casting property as well as thermal stability, which comprises: a main layer and a sublayer.

Another object of the invention is to provide a composite polyester film having excellent uniformity of thickness, transparency, and fewer fish eyes resulting from polymer gel formed by thermal degradation.

Another object of the invention is to provide a composite polyester film having excellent smoothness and suitable slipperiness and a specified amount of inactive particles contained in the polyester of a sublayer.

A further object of the invention is to provide a composite polyester film in which numerous protrusions, when numerous inactive particles are contained in the polyester of the sublayer, are formed on the film surface, so as to afford the film excellent smoothness and electromagnetic transfer characteristic.

DISCLOSURE OF THE INVENTION

Accordingly, the object of the invention is attained by providing a composite polyester film comprising a main layer and a sublayer, the sublayer being made from a polyester having a specific resistance of the polymer in a melt state of less than $5 \times 10^8 \Omega \cdot cm$ and which is lower than that of the main layer, the thickness of the sublayer being 1/200-4/10 of the overall thickness of the composite polyester film.

Examples of polyester in the present invention include homopolymers such as polyethylene terephthalate, polyethylene-2, 6-naphthalate, polyethylene-1, 2-bis(2-chlorophenoxy) ethane-4, 4'-dicarboxylate and the like, copolyesters employing ethylene terephthalate as a main repeating unit, copolyesters employing ethylene-2, 6-naphthalate as a main unit, and the like. It is preferable that the amount of other dicarboxylic acid and glycol components of the copolyester are not more than 20 mole %. The copolymer components of the polyester are composed of the following acid and diol components: the acid components may be aromatic dicarboxylic acids such as isophthalic acid and the like, aliphatic dicarboxylic acids such as adipic acid and the like, and hydroxycarboxylic acids such as hydroxybenzoic acids and the like; examples of diol components are propylene glycol, trimethylene glycol, neopentyl glycol, 1,4-cyclohexanedimethanol and the like as well as ethylene glycol.

The main layer and sublayer of the composite polyester film in this invention may be composed of either the same polyester or different polyesters. The main layer may be further made from either of the polyesters.

The specific resistance of the polymer in a melt state in the present invention is measured in the following manner.

Figure 1:
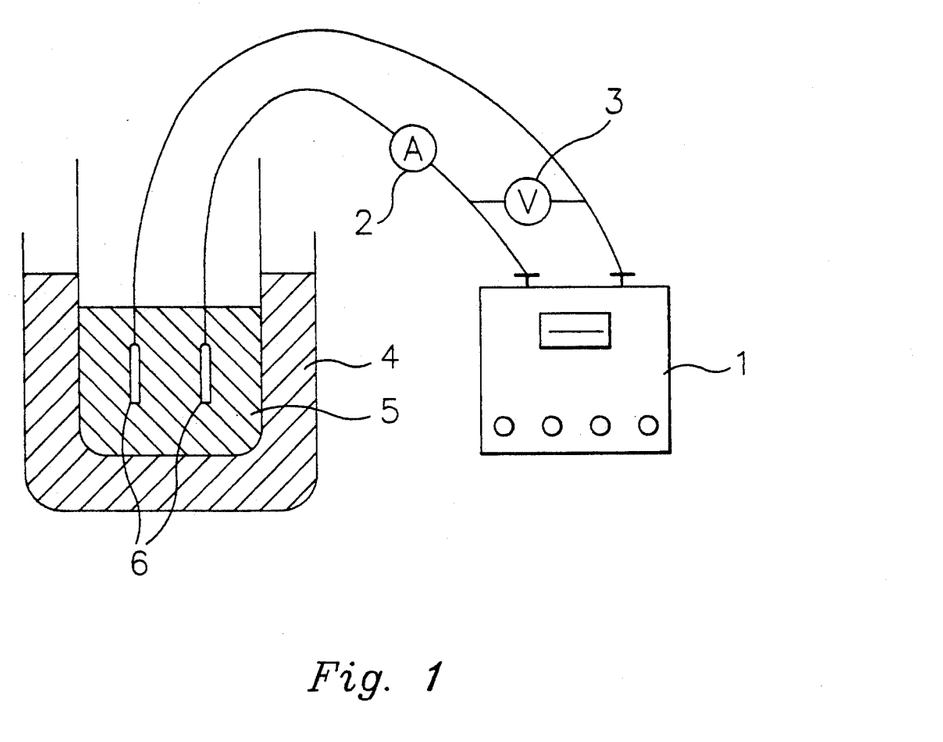
FIG. 1 is a schematic view illustrating an apparatus for measuring the specific resistance of the polymer in a melt state of the polyester.

A measuring apparatus, as shown in FIG. 1, can be employed. Polyester 5 to be measured is put into a vessel with a pair of electrodes 6 inserted. This vessel is immersed into a heater 4. The polyester 5 is melted and stored at 280° C. under nitrogen atmosphere. Subsequently a voltage is applied from a direct current high voltage generator 1. The specific resistance of the polymer in a melt state can be obtained by putting the values indicated with an ammeter 2 and a voltmeter 3, the electrode area and the distance between the electrodes into the following formula:

$$\rho = \frac{V \times S}{I \times D} \quad (1)$$

wherein:

ρ: specific resistance of the polymer in a melt state (Ω·cm)
V applied voltage (V)
S: electrode area (cm$^2$)
I: measured electric current (A)
D: distance between the electrodes (cm)

The specific resistance of the polymer in a melt state of the composite polyester film constituting the sublayer in the present invention is less than $5\times10^8$ Ω·cm, preferably less than $3\times10^8$ Ω cm and more preferably less than $1\times10^8$ Ω·cm. When the specific resistance of the polymer in a melt state of the polyester comprising the sublayer is not less than $5\times10^8$ Ω·cm, the electrostatic impression casting property decreases and waviness (hereinafter referred to as impression irregularities) readily forms on the film so that film forming productivity decreases. When the specific resistance of the polymer in a melt state of the polyester constituting the sublayer is not less than $1\times10^7$ Ω·cm, the polyester is preferable for thermal stability. When the specific resistance of the polymer in a melt state of the polyester constituting this sublayer is in the range of $0.5\times10^8$ Ω·cm to $2.0\times10^8$ Ω·cm, the film is suitable for a base film for use in a magnetic recording medium, particularly for a base film for use in metal evaporated magnetic tape or metal powder magnetic tape. When this specific resistance of the polymer in a melt state is in the range of $0.1\times10^8$ Ω·cm to $1.0\times10^8$ Ω·cm, the film is suitable as a base film for use in a capacitor or magnetic recording medium.

In addition, the specific resistance of the polymer in a melt state of the polyester (b) constituting the main layer may be suitably higher than that of the sublayer. If it is preferably not less than $5\times10^8$ Ω·cm, and more particularly not less than $1\times10^9$·cm, the composite film may have suitably increased thermal stability and decreased fish eyes. The specific resistance of the polymer in a melt state of the polyester is influenced by the species, existing state and amount of the metal compounds. Generally, there is a tendency that the greater the amount of the metal in the polyester and is not deactivated by phosphorus compounds and the like and the smaller the deposit of metal compound particles in the polyester, the lower the specific resistance of the polymer in a melt state.

The relationship between the specific resistance of the polymer in a melt state and the metal will be explained by taking an example of polyethylene terephthalate (PET) obtained by a transesterification method.

In transesterification, alkali metal compounds, alkaline earth metal compounds, zinc compounds and manganese compounds and the like are normally employed as a reaction catalyst, and a phosphorus compound is further added when the reaction is substantially complete. The metal compound employed as the reaction catalyst is partly inactivated by the phosphorus compound. The reactant thus obtained is subjected to a polycondensation reaction to form PET in the presence of a polycondensation catalyst such as an antimony compound, titanium compound, germanium compound or the like. Normally, PET is prepared in the above manner. The specific resistance of the polymer in a melt state is affected mainly by the alkali metal compound, magnesium and calcium compounds, zinc compound, manganese compound and phosphorus compound. These metal compounds and phosphorus compound are liable to form particles insoluble in the polyester and to decrease thermal stability.

The specific resistance of the polymer in a melt state is correlated with the following formula:

$$M+(A/2)-P$$

where M represents the number of moles of magnesium and calcium compounds zinc compound and manganese compound contained in $10^6$ g of the polyester, A and P represent the number of moles of alkali metal compound and phosphorus compound respectively, contained in $10^6$ g of the polyester.

The higher the value obtained by using the above formula, the greater the improvement in the specific resistance of the polymer in a melt state and the greater the improvement in the electrostatic impression casting property of the polyester.

Specifically, when the specific resistance of the polymer in a melt state of the polyester constituting the sublayer (a) may preferably satisfy the following formula, $$M+(a/2)-P \geqq 0.5 (I)$$

and more particularly $$10.0M+(A/2)-P \geqq 0.5,$$

suitable electrostatic impression casting property and thermal stability can be obtained.

Metal compounds controlling the specific resistance of the polymer in a melt state in the present invention may be, for example, aliphatic carboxylates and halides of magnesium, calcium, zinc, manganese, alkali metal compounds, and glycol-soluble metal compounds of alcoholates and the like such as methylate, ethylate, and ethylene glycolate and the like. The aliphatic carboxylates, halides and glycol-soluble metal compounds may be added in the polyester manufacturing process. Specific examples of such metal compounds are: manganese acetate, magnesium acetate, calcium acetate, zinc acetate, lithium acetate, potassium acetate, sodium acetate, magnesium propionate, manganese propionate, potassium propionate, calcium propionate, zinc propionate, magnesium chloride, lithium chloride, manganese bromide, magnesium hydroxide, manganese hydroxide, calcium hydroxide, zinc hydroxide, lithium hydroxide, magnesium glycolate, calcium glycolate, lithium methylate, butyl potassium and the like, and combinations of two or more of such compounds may also be employed.

Particularly, magnesium compounds, manganese compounds and alkali metal compounds are preferably employed for suppressing formation of the insoluble compounds and decrease in thermal stability.

In the transesterification method, these metal compounds may be added as a catalyst before the transesterification, and they ma be further added after the transesterification. In trans- esterification, it is preferable that metal compounds are added when the conversion of the esterification reaction reaches preferably no less than 90% and suitably not less than 95%.

Phosphorous compounds may employ at least one specie selected from phosphoric acid, phosphorous acid and esters of those acids. Specific examples of such phosphorus compounds are phosphoric acid, monomethyl phosphate, dimethyl phosphate, trimethyl phosphate, tributyl phosphate, phosphorous acid, trimethyl phosphite, tributyl phosphite and the like.

It is necessary that the specific resistance of the polymer in a melt state of the polyester film (a) constituting the sublayer of the composite polyester film is lower than that of the polyester film (b) constituting the main layer of the composite polyester film according to this invention. When the specific resistance of the polymer (a) in a melt state of the sublayer is higher than the specific resistance of the polymer (b) in a melt state of the main layer, the electrostatic impression casting property is low, so that the film forming productivity decreases, whereas if the film forming productivity is increased, impression irregularities would be readily formed and the thickness of the film would become uniform so that the film had insufficient smoothness and low transparency.

In addition, it is necessary that the thickness of the polyester (a) constituting the sublayer is 1/200 to 4/10 of the overall thickness of the composite film. When the thickness of the sublayer is less than 1/200, the electrostatic impression casting property decreases. Therefore, the film forming productivity decreases and the impression irregularities occur. Accordingly it is difficult to laminate the layers uniformly. On the other hand, when the thickness of the sublayer exceeds 4/10, the electrostatic impression casting property is improved. However, the thermal stability decreases so that polymer gel formed by thermal degradation is readily formed. In the base film A, the thickness of the sublayer is preferably 1/50 to 3/10, and more preferably 1/20 to 2/10. In the base film B, the thickness of the sublayer is preferably 1/200 to 1/20 and, more preferably 1/200 to 1/50.

The thickness of the composite film is not particularly limited; however, it is preferably 0.5 to 100 $\mu$m, and more preferably 1 to 80 $\mu$m.

The sublayer constituting the composite film in the present invention may be laminated on either surface of the main layer or the respective surfaces of the main layer. When the composite film is casted, it is preferable that the sublayer is formed on the casting drum side.

The sublayer may be formed on either one surface or respective surfaces of the main layer for use in a magnetic recording medium. However, it is preferable to form the sublayer on either one surface of the main layer, considering electrical properties.

In the composite polyester film according to the present invention, it is preferable to add inactive particles to the polyester constituting the sublayer so as to increase the slipperiness. The composite polyester films suitable for use can be obtained by adjusting the size and content of the inactive particles. In general, the electromagnetic transfer characteristic depends inversely on the smoothness. Therefore, the size and content of the inactive particles may preferably be adjusted depending on the purpose.

Now, the composite polyester suitable for the base film for a magnetic recording medium, particularly the base film for metal evaporated magnetic tape and metal powder magnetic tape, will be described.

When the suitable 0.001 to 0.5 % by weight of inactive particles is added to the polyester (a) constituting the sublayer of the composite polyester, the average particle diameter being preferably 30nm to 2.0 $\mu$m, the smoothness of the film surface will be suitable. In this instance, the thickness of the polyester (a) of the sublayer is 1/200 to 4/10, preferably 1/50 to 3/10, and more preferably 1/20 to 2/10 of the overall film thickness. In addition, the specific resistance of the polymer in a melt state of the polyester (a) constituting the sublayer is preferably less than $5 \times 10^8 \Omega \cdot cm$ and suitably $0.5 \times 10^8 \Omega \cdot cm$ to $2.0 \times 10^8 \Omega \cdot cm$. It is preferable that the specific resistance of the polymer in a melt state of the polyester (b) constituting the main layer is higher than that of the sublayer. When this specific resistance of the polymer in a melt state is preferably not less than $5 \times 10^8 \Omega \cdot cm$, and particularly not less than $10 \times 10^8 \Omega \cdot cm$, the thermal stability may be sufficiently improved. The average particle diameter of the inactive particles to be added to the sublayer may be preferably 30 nm to 2.0 $\mu$m, and suitably 50 nm to 1.0 $\mu$m, and particularly 0.01 to 500 nm. The content of the inactive particles is preferably 0.01 to 0.5% by weight, and suitably 0.01 to 0.2% by weight.

In this instance, since the composite polyester film is excellent in electrostatic impression casting property, the film forming productivity can be improved and the uniformity of the film thickness is excellent. In addition, such composite polyester film can suppress the formation of fish eyes resulting from the polymer gel formed by thermal degradation.

Now, the composite polyester film for the base film for a magnetic recording medium or capacitor will be described.

When inactive particles, the average particle diameter being preferably 30 nm to 1.0 $\mu$m and suitably 100 to 600 nm, may be added to the polyester (a) constituting the sublayer of the composite polyester, the amount of inactive particles added being preferably 1.0 to 20% by weight, and suitably 5 to 15% by weight, the relationship between smoothness and the electromagnetic transfer characteristic will be sufficiently suitable. The specific resistance of the polymer in a melt state of the polyester (a) constituting the sublayer is less than $5 \times 10^8 \Omega \cdot cm$, and suitably $0.1 \times 10^8 \Omega \cdot cm$ to $1.0 \times 10^8 \Omega \cdot cm$.

In this instance, it is preferable that the specific resistance of the polymer in a melt state of the polyester (b) constituting the main layer is higher than that of the sublayer. When the specific resistance of the polymer in a melt state is less than $5.0 \times 10^9 \Omega \cdot cm$, such an effect is particularly pronounced.

When the sublayer is composed of the polyester having the low specific resistance of the polymer in a melt state and a high concentration of minute particles, the numerous protrusions with uniform height can be formed by laminating such sublayers on the polyester of the main layer. Accordingly, the film having improved smoothness and electromagnetic transfer characteristic can be efficiently manufactured. In addition, the thermal stability of the composite film thus obtained is improved so that the formation of gel particles can be suppressed.

The inactive particles which can be contained in the composite sublayer are, for example, $TiO_2$, $Al_2O_3$, $SiO_2$, ZnO, MgO, $CaCO_3$, $CaSO_4$, $BaSO_4$, tetrafluoroethylene, polystyrene and the like. A combination of two or more species can also be used.

The shape of the inactive particles is preferably substantially a true sphere in order to maintain the uniformity of the film surface state. Such spherical inactive particles are suitably $SiO_2$ represented typically by colloidal silica, cross-linked polystyrene, divinylbenzene based cross-linked high polymer, $TiO_2$ and the like.

The inactive particles may be contained in the polyester (b) constituting the main layer for improving the slipperiness. However, the content, average particle diameter etc. of the inactive particles are preferably within the ranges of those of the polyester (a) constituting the sublayer.

The composite polyester film in the present invention is produced for example in the following ways.

Polyester (a) having a specific resistance of the polymer in a melt state of less than $5 \times 10^8 \Omega \cdot cm$ is compounded with polyester (b) having higher specific resistance of the polymer in a melt state than (a) so as to make the layer formed from (a) occupy 1/200 to 4/10 of the overall thickness. The melt-extruded composite unstretched sheet is electrostatically made adherent to the rotating quenching drum, followed by quenching and solidifying. In another method, polyester (a) contains the amounts of such compounds that meet the general formula (I). These compounds include phosphorus compounds, alkali metal compounds, and at least one species of the compounds selected from magnesium compounds, manganese compounds, zinc compounds and calcium compounds. Polyester (b) has smaller amount obtained by using the formula $[M+(A/2)-P]$ than that of polyester (i). The polyester (i) is compounded with the polyester (b) to make the layer formed from (a) occupy 1/200 to 4/10 of the overall thickness of the film.

Specifically, the polyesters (a) to form the main and the sublayers are melt-extruded to form the composite unstretched sheet. Then, this unstretched sheet is quenched by the rotating quenching drum. The electrostatic impression casting method is employed to increase the adherence of the polyester sheet to the rotating quenching drum. In this instance, the adherence is effectively further improved by contacting the polyester on the sublayer side with the rotating quenching drum. The metal content of the polyester of the sublayer can be suppressed by this method. Accordingly, such a method is more desirable with respect to electrical properties, smoothness of the film surface, thermal stability of the film etc.

THE BEST MODE FOR CARRYING OUT THE INVENTION

The present invention will be explained by illustration by the following examples. The term "part" used in the examples is a part by weight. The methods for measuring each characteristic are illustrated as follows.

Intrinsic viscosity o-chlorophenol was employed as solvent, and the measurement was conducted at 25° C.

Softening point

The measurement was conducted by the use of a penetrometer and is indicated by SP (° C.) value Determination of metal element (M,A), phosphorus element and inorganic particles.

The measuremetns were conducted by a known method. Specifically, the metal element and inorganic particles were determined for the respective amounts by atomic absorption spectrometry after the polyester was wet ashed. Phosphorus element was determined by the molybdenum blue colorimetry method.

Thickness of the laminated layer

The several levels of polyesters having known amounts of metal and phosphorus were prepared in advance. Then, the concentration ratios of respective metal element ($M^+$) and phosphorus element ($P^+$) to carbon element, namely, ($M^+/c^+$) and ($P^+/C^+$) were measured by the secondary ion mass spectrometry (SIMS) method.

Next, the concentration ratios ($M^+/c^+$) and ($P^+/C^+$) were measured from the polyester surface layer on the sublayer side in the inner direction of the film. The concentrations of the metal elements and phosphorus element at the respective depths can be obtained by the concentration ratios obtained. The depth measured was obtained by taking the depth of up to 50% of the overall depth of the film.

The difference of the concentrations thus measured, namely, ($M^+/c^+$) $-$ ($P^+/C^+$) showed a high value at the film surface. This value rapidly decreased when approaching the main surface, after which it reached a constant value. These two inflexion points were connected by a straight line. The midpoint of the length of the straight line to the surface of the sublayer was defined as the thickness Thermal stability The polyester was melted at 300° C. under $N_2$ gas atmosphere. The intrinsic viscosities were measured at 8 and 68 minutes after melting initiation, and the change in intrinsic viscosity ($\Delta IV$) was calculated.

The lower the $\Delta IV$, the more excellent the thermal stability.

Average particle size of the inactive particles in the polymer

The average particle size was determined as a median in the cumulative distribution curve by volume measured with an electron microscope, and here the particle size was expressed as the equivalent spherical diameter. The equivalent sphere diameter is the diameter of the sphere having the same particle volume as the volume of the particle.

Electrostatic impression casting property

An electric voltage of 6 KV was applied between the rotating quenching drum and an electrode provided between the extrusion die and the rotating quenching drum. The casting speed (m/min) was gradually increased and measured when impression irregularities formed. The casting speeds were judged by the following criteria. Not lower than second grade were determined as an acceptable product.

| | |
|---|---|
| not lower than 50 m/min | 1st grade |
| 40 to 49 m/min | 2nd grade |
| 30 to 39 m/min | 3rd grade |
| lower than 30 m/min | 4th grade |

Insulation breakdown voltage

The test was conducted by the use of an a.c. voltage proof tester in accordance with JIS-C-2318.

Fish eyes in the film

By employing a polarizing microscope at 100 magnifications, a bi-oriented film was measured for the positions having stretched fish eye-shaped defects of not less than 0.25 μm in height caused by the polymer gel and metal compound foreign particles. The measurements were ranked as follows.

| rank | numbers/100 cm² |
| --- | --- |
| 1st grade | The Nos of fish eyes are less than 10 |
| 2nd grade | The Nos of fish eyes are 10 to 20 |
| 3rd grade | The Nos of fish eyes are 21 to 50 |
| 4th grade | The Nos of fish eyes are not less than 51 |

1st and 2nd grades were determined as acceptable products.

REFERENCE EXAMPLE 1 production of polymer I

Bis - (β- hydroxylethyl) terephthalate and its low polymers were obtained by reacting terephthalic acid and ethylene glycol (mole ratio 1.15), and were stored in a melt state in the esterification reaction vessel at 250° C. A slurry was obtained by mixing 86.5 parts of terephthalic acid with 31.7 parts of ethylene glycol (mole ratio 1.15). This slurry was continuously fed for 3.5 hours into the esterification reaction vessel, and was maintained at 250° C. The water formed by the esterification reaction was removed from the reaction mixture through a rectification column. After the supply of the slurry finished, the esterification reaction was further continued for 1.5 hours and was substantially completed. The reaction degree was 98.3%.

104.8 parts of the reaction mixture obtained was transferred to a polycondensation vessel. A solution of 0.013 parts of trimethyl phosphate and 0.5 parts of ethylene glycol were added. Next, 0.015 parts of germanium dioxide were dissolved into 0.015 parts of tetraethyl ammonium hydroxide, subsequently diluted with 0.5 parts of ethylene glycol. This resulting solution was added to the reaction mixture in the condensation reaction vessel, followed by polymerization for 3.0 hours in the conventional method. Polymer I having an intrinsic viscosity of 0.612 was obtained. The phosphorus content in the polymer I was 25 ppm (P=0.81 mol/$10^6$ g PET). SP was 255.3° C.

REFERENCE EXAMPLE production of polymer II 0.04 parts (M=1.86 mol/$10^6$ g) of magnesium acetate, 0.005 parts (A=0.5 mol/$10^6$ g) of lithium acetate, 0.02 parts of antimony trioxide were added to a mixture of 99.8 parts of dimethyl terephthalate and 70 parts of ethylene glycol, after which the temperature of the mixture gradually was increased from 145° to 235° C. in 3.5 hours. The methanol was removed from reaction mixture and the transesterification reaction was completed.

A solution of 0.010 parts of trimethyl phosphate in 0.5 parts of ethylene glycol was added to the reaction product, after which 0.2 parts of cross-linked polystyrene having an average diameter of 180 nm was added. This resulting mixture was transferred to a polycondensation reaction vessel, and the polymer II was obtained through subsequent polycondensation reaction for 3.0 hours in the conventional method. The intrinsic viscosity of the polymer II thus obtained was 0.608. The phosphorus content was 20 ppm (P=0.65 mol/$10^6$ g PET). SP was 260.8° C. and the average particle diameter was 180 nm.

REFERENCE EXAMPLE 3 production of polymer III 0.056 parts (2.29 mol mol/$10^6$ g) of magnesium acetate and 0.02 parts of antimony trioxide were added to 90 parts of dimethyl terephthalate and 57 parts of ethylene glycol, after which the temperature of the mixture gradually was increased from 145° to 235° C. in 3.5 hours. The methanol was distilled and the transesterification reaction was completed.

A solution of 0.01 parts of phosphoric acid in 0.1 parts of ethylene glycol was added to the reaction product. Subsequently a slurry composed of 10 parts of colloidal silica and 100 parts of ethylene glycol was continuously added in 30 minutes to distill excess glycol. The colloidal silica had an average particle diameter of 300 nm and contained 0.11 parts by weight of sodium. The resulting product was transferred to a polycondensation reaction vessel, and the polymer III was obtained through subsequent polycondensation reaction for 3.0 hours in the conventional method. The intrinsic viscosity of the polymer III thus obtained was 0.591. Phosphorus contents were 25 ppm (p=0.81 mol/$10^6$g). SP was 262.0° C. and the average particle diameter was 310 nm.

REFERENCE EXAMPLE 4 production of polymer IV

A solution of 0.1 parts of magnesium acetate, 0.1 parts of lithium acetate (A=9.8 mol/$10^6$), 0.015 parts of germanium dioxide and 0.015 parts of ammonium hydroxide were added to a mixture of 99.8 parts of dimethyl terephthalate and 70 parts of ethylene glycol, after which the temperature of the mixture gradually was increased from 145° to 235° C. in 3.5 hours. The methanol was removed from the reaction mixture and the transesterification reaction was completed.

A slurry of 0.7 parts of magnesium acetate (total M=37.29 mol/$10^6$g) and 3.5 parts of ethylene glycol was added to the reaction product. After 10 minutes, a solution composed of 0.25 parts of trimethyl phosphate and 3.5 parts of ethylene glycol was added, after which 0.2% by weight of colloidal silica having an average particle diameter of 180 nm was added. The excess ethylene glycol was removed from the reaction mixture, after which the reaction product was transferred to a polycondensation vessel, and the polymer IV was obtained through subsequent polycondensation reaction for 3.0 hours in the conventional method. The intrinsic viscosity of the polymer IV thus obtained was 0.603. The phosphorus content was 420 ppm (p=13.56 mol/$10^6$ g). The SP was 256.5° C. and the average particle diameter was 180 nm.

REFERENCE EXAMPLE production of polymer V

Polymer V was obtained in a way quite similar to Example 2 except that 5.2 parts of colloidal silica having an average particle diameter of 500 nm were substituted for the cross-linked polystyrene having an average particle diameter of 180 nm which was added in Reference Example 2.

REFERENCE EXAMPLE 6 production of polymer VI

Catalysts composed of 0.06 parts of magnesium acetate (M=2.8 mol/$10^6$ g), 0.01 parts of lithium acetate (A=0 98mol/$10^6$ g) and 0.01 parts of antimony trioxide were added to 92 parts of dimethyl 2,6-naphthalenedicarboxylate and 50 parts of ethylene glycol. The temperature of the mixture gradually was increased from 170° to 240° C. in 3.5 hours. Methanol was removed from the reaction mixture and the transesterification reaction was completed.

A solution of 0.015 parts of trimethylphosphate in 0.5 parts of ethylene glycol were added to the reaction product, and subsequently a slurry composed of 8 parts of colloidal silica and 80 parts of ethylene glycol was continuously added in 30 minutes. The colloidal silica had an average particle diameter of 300 nm and did not contain alkali metal. The excess ethylene glycol was removed from the reaction mixture. The resulting product was transferred to a polycondensation reaction vessel, and the polymer VI was obtained through subsequent polycondensation reaction for 2.5 hours in the conventional method. The intrinsic viscosity of the polymer VI thus obtained was 0.597. The phosphorus content was 30 ppm (p=0.97 mol/$10^6$ g). SP was 273.5° C. and the average particle diameter was 300 nm Polymer characteristics of Reference Examples are shown in Table 1.

EXAMPLE 1

Polymer A was obtained by melting polymer I obtained from Reference Example I at 300° C. after drying at 160° C. for 3 hours. 95 parts of polymer I in Reference Example 1 were mixed with 5 parts of polymer IV in Reference Example 4. This mixture was dried in a similar manner to that stated above, then melted at 300° C. by the use of another melt mixture. Thus polymer B was obtained.

The above two species of the melt polymer were introduced into a die. A melt composite sheet having a thickness of 150 μm ( the ratio of thickness of sublayer to overall thickness =1/10) is formed by respectively laminating polymer A and polymer B as a main layer and a sublayer within a die. When cooling the melt composite sheet with a rotating quenching drum, the polymer B was contacted with the revolving drum, subsequently 6 KV of d.c. voltage was applied from a wire electrode from the upper surface of the polymer A, after which the composite sheet was stretched 3.5 times lengthwise and width wise. A biaxially oriented film having a thickness of 12 μm was formed by thermal fixing for 15 seconds at 210° C. The compositions of polymers constituting the main layer and the sublayer, and the species, average particle diameter and content of inactive particles are given in Table 2. The electrostatic impression casting property and characteristics of the film obtained are shown in Table 3.

EXAMPLES 2 to 9 AND COMPARATIVE EXAMPLES 1 TO 3

A biaxially oriented film was obtained in a way quite similar to Example 1 except that the thickness ratio of the main layer and the sublayer and the mixing composition of polymers A and B comprising respectively the main layer and the sublayer were changed as illustrated in Tables 2 and 3. As shown in Table 3, when the thickness of the sublayer does not meet the range in accordance with the present invention (comparative example 1), the film formed had not only an insufficient electrostatic impression casting property but also lamination irregularities. In the case of exceeding the range of the thickness of the sublayer in accordance with this invention (comparative Example 2), insulation breakdown voltage decreases and fish eyes increase, resulting in insufficient thermal stability. In addition, when the specific resistance of the polymer in a melt state of polymer B constituting the sublayer was more than the specific resistance of the polymer in a melt state as defined in this invention (comparative example 3), the electrostatic impression casting property is insufficient and many impression irregularities formed.

EXAMPLE 10 AND COMPARATIVE EXAMPLES 4 AND 5

A biaxially oriented film as shown in Tables 2 and 3 was obtained in a way quite similar to Example 8 except that polymer I in Reference Example 1 and polymer V in Reference Example 5 were employed as polymers of the main layer and the sublayer respectively. The electrostatic impression casting property and fish eyes of the film were preferable. On the other hand, a biaxially oriented film having a thickness of 12 μm was produced by forming a monolayer composed solely of polymer obtained from Reference Example 1. This oriented film had an insufficient electrostatic impression property and many impression irregularities so that product film could not be obtained (comparative example 4). Further, a biaxially oriented film having a thickness of 12 μm was produced by forming a monolayer composed solely of polymer obtained from Reference Example 5. The biaxially orientated film had insufficient thermal stability and many fish eyes (comparative example 5).

EXAMPLE 11

A biaxially oriented film was obtained in a way quite similar to Example 1 except that the respective polymers constituting a main layer and a sublayer employed the polymers in Reference Examples 1 and 6 respectively, the sublayers being laminated on the respective surfaces of the main layer to occupy respectively a thickness of 1/100 of the main layer (total sublayer thickness=1/50). The electrostatic impression casting property was 2 nd grade and fish were 1 st grade. ΔIV was 0.062. The electrostatic impression casting property and film characteristics were satisfactory.

EXAMPLE 12

A biaxially oriented film was obtained in a way similar to Example 1 except that a main layer was composed of polymer I in Reference Example 1 mixed with polymer IV in Reference Example 4 in the ratio of 98:2 (weight ratio) and a sublayer was composed of polymer III in Reference Example 3, the sublayers being formed on the respective surfaces on the main layer to occupy respectively a thickness of 1/100 of the overall thickness of the composite film. The electrostatic impression casting property and fish eyes were 2 nd grade. ΔIV was 0.065. The electrostatic impression property and film characteristic were satisfactory.

TABLE 1

| | Name of Polymer | M (mol/ $10^6$ g) | A (mol/ $10^6$ g) | P (mol/ $10^6$ g) | M + A/2-P (mol/$10^6$ g) | Inactive Particles Species | Average Diameter (nm) | Content (%) | Intrinsic Viscosity | SP (°C.) | Melt Resistance (Ω · cm) |
|---|---|---|---|---|---|---|---|---|---|---|---|
| Reference Example 1 | I | 0 | 0 | 0.81 | −0.81 | — | — | — | 0.612 | 255.3 | $2.0 \times 10^9$ |
| Reference Example 2 | II | 1.86 | 0.50 | 0.65 | 1.46 | Cross-linked Polystyrene | 180 | 0.2 | 0.608 | 260.8 | $0.9 \times 10^8$ |
| Reference Example 3 | III | 2.29 | — | 0.81 | 1.48 | Colloidal Silica | 310 | 10.0 | 0.591 | 262.0 | $0.5 \times 10^8$ |
| Reference Example 4 | IV | 37.29 | 9.8 | 13.56 | 28.63 | Colloidal Silica | 180 | 0.2 | 0.603 | 256.5 | $5.4 \times 10^6$ |
| Reference Example 5 | V | 1.86 | 0.50 | 0.65 | 1.46 | Colloidal Silica | 500 | 5.0 | 0.601 | 260.8 | $0.9 \times 10^8$ |
| Reference Example 6 | VI | 2.8 | 0.98 | 0.97 | 2.32 | Colloidal Silica | 300 | 8.0 | 0.597 | 273.5 | $1.5 \times 10^8$ |

TABLE 2

| | Main Layer Composition (%) | | | | | Sublayer Composition (%) | | | | | Inactive Particles | | |
|---|---|---|---|---|---|---|---|---|---|---|---|---|---|
| | I | II | III | IV | V | I | II | III | IV | V | Species | Average Diameter (nm) | Contents (%) |
| Example 1 | 100 | — | — | — | — | 95 | — | — | 5 | — | Silica | 180 | 0.01 |
| Example 2 | 100 | — | — | — | — | 95 | — | — | 5 | — | Silica | 180 | 0.01 |
| Example 3 | 100 | — | — | — | — | 95 | — | — | 5 | — | Silica | 180 | 0.01 |
| Example 4 | 100 | — | — | — | — | 95 | — | — | 5 | — | Silica | 180 | 0.01 |
| Example 5 | 100 | — | — | — | — | 95 | — | — | 5 | — | Silica | 180 | 0.01 |
| Example 6 | 100 | — | — | — | — | 90 | — | — | 10 | — | Silica | 180 | 0.02 |
| Example 7 | 100 | — | — | — | — | — | 100 | — | — | — | PSt | 180 | 0.2 |
| Example 8 | 98 | — | — | 2 | — | — | — | 100 | — | — | Silica | 310 | 10.0 |
| Example 9 | 97 | — | — | 3 | — | — | — | 100 | — | — | Silica | 310 | 10.0 |
| Comparative Example 1 | 97 | — | — | 3 | — | — | — | 100 | — | — | Silica | 310 | 10.0 |
| Comparative Example 2 | 100 | — | — | — | — | 90 | — | — | 10 | — | Silica | 120 | 0.02 |
| Comparative Example 3 | 98 | — | — | 2 | — | 99 | — | — | 1 | — | Silica | 120 | 0.002 |
| Example 10 | 100 | — | — | — | — | — | — | — | — | 100 | Silica | 500 | 5.0 |
| Comparative Example 4 | 100 | — | — | — | — | — | — | — | — | — | — | — | — |
| Comparative Example 5 | — | — | — | — | — | — | — | — | — | 100 | Silica | 500 | 5.0 |

Silica: Colloidal Silica
Pst: Cross-linked Polystyrene

TABLE 3

| | Main Layer | | Sublayer | | | Film Characteristic | | | |
|---|---|---|---|---|---|---|---|---|---|
| | M + A/2-P (mol/$10^6$ g) | Melt Specific Resistance (Ω · cm) | M + A/2-P (mol/$10^6$ g) | Melt Specific Resistance (Ω · cm) | Sublayer Thickness Ratio (Sublayer Thickness / Overall Thickness) | Static Impression Casting Property | Fish Eyes | Thermal Stability (ΔIV) | Insulation Breakdown Voltage (V/μ) |
| Example 1 | −0.81 | $2.0 \times 10^9$ | 0.66 | $1.6 \times 10^8$ | 1/10 | 1 grade | 1 grade | 0.071 | 530 |
| Example 2 | −0.81 | $2.0 \times 10^9$ | 0.66 | $1.6 \times 10^8$ | 2/10 | 1 grade | 1 grade | 0.085 | 523 |
| Example 3 | −0.81 | $2.0 \times 10^9$ | 0.66 | $1.6 \times 10^8$ | 3/10 | 1 grade | 2 grade | 0.088 | 510 |
| Example 4 | −0.81 | $2.0 \times 10^9$ | 0.66 | $1.6 \times 10^8$ | 0.5/10 | 2 grade | 1 grade | 0.063 | 530 |
| Example 5 | −0.81 | $2.0 \times 10^9$ | 0.66 | $1.6 \times 10^8$ | 0.3/10 | 2 grade | 1 grade | 0.060 | 535 |
| Example 6 | −0.81 | $2.0 \times 10^9$ | 2.13 | $0.5 \times 10^8$ | 0.5/10 | 1 grade | 1 grade | 0.073 | 510 |
| Example 7 | −0.81 | $2.0 \times 10^9$ | 1.46 | $0.9 \times 10^8$ | 1/10 | 1 grade | 1 grade | 0.075 | 520 |
| Example 8 | −0.22 | $4.0 \times 10^8$ | 1.48 | $0.5 \times 10^8$ | 1/100 | 2 grade | 1 grade | 0.061 | 500 |
| Example 9 | 0.07 | $1.2 \times 10^8$ | 1.48 | $0.5 \times 10^8$ | 1/150 | 2 grade | 1 grade | 0.065 | 510 |
| Comparative Example 1 | 0.07 | $1.2 \times 10^8$ | 1.48 | $0.5 \times 10^8$ | 1/300 | 4 grade | 1 grade | 0.059 | 530 |
| Comparative Example 2 | −0.81 | $2.0 \times 10^9$ | 2.13 | $0.5 \times 10^8$ | 6/10 | 1 grade | 4 grade | 0.0141 | 400 |
| Comparative Example 3 | −0.22 | $4.0 \times 10^8$ | −0.51 | $1.0 \times 10^9$ | 1/10 | 4 grade | 1 grade | 0.060 | 540 |
| Example 10 | −0.81 | $2.0 \times 10^9$ | 1.46 | $0.9 \times 10^8$ | 1/100 | 1 grade | 1 grade | 0.074 | 500 |
| Comparative Example 4 | −0.81 | $2.0 \times 10^9$ | — | — | 0/10 monolayer | 4 grade | 1 grade | 0.055 | 540 |
| Comparative Example 5 | — | — | 1.46 | $0.9 \times 10^8$ | 0/10 monolayer | 1 grade | 4 grade | 0.141 | 380 |

INDUSTRIAL APPLICABILITY

The composite polyester film of the present invention is a composite product prepared from polyesters having different specific resistance of the polymer in a melt state, so that the present invention has the following effects. Though the total metal amount is small, specific resistance of the polymer in a melt state is low in the surface of the composite film. The electrostatic impression casting property is extremely preferable.

The composite polyester film employed in this invention has a thin sublayer having low specific resistance of the polymer in a melt state. Consequently the total metal amount is small and thermal stability is preferable.

Further, when the composite polyester has a specified amount of inactive particles contained in the sublayer, the composite polyester has excellent in smoothness and suitable slipperiness.

In addition, when the composite polyester film in this invention has a large amount of inactive particles in the sublayer, the inactive particles are abundant only in the surface of the composite film so that the composite polyester film is excellent in the uniformity of the height of protrusions and slipperiness, and also excellent in electromagnetic transfer characteristics as a film for a magnetic recording medium.

The composite polyester film of this invention has diversified uses such as a magnetic recording medium, a base film for metal evaporated magnetic tape, base film for metal powder magnetic tape and the like. In its use in capacitors, the composite polyester film of this invention is excellent in insulation breakdown voltage, and particularly useful for a thin layer capacitor.

We claim:

1. A composite polyester film comprising a main layer and at least a sublayer, wherein the specific resistance in a melt state of the polyester constituting said sublayer is less than $5 \times 10^8$ Ω·cm and is less than the specific resistance in a melt state of the polyester constituting said main layer, and the thickness of the sublayer is from 1/200 to 4/10 of the overall thickness of said composite film.

2. The composite polyester film of claim 1 further comprising a second sublayer on the surface of said main layer opposite to said sublayer, wherein the specific resistance in a melt state of the polyester constituting said second sublayer is less than $5 \times 10^8$ Ω·cm and is less than the specific resistance in a melt state of the polyester constituting said main layer, and the thickness of said second sublayer is from 1/200–4/10 of the overall thickness of the composite film.

3. A composite polyester film comprising a main layer and at least a sublayer, wherein the specific resistance in a melt state of the polyester constituting said sublayer is less than $5 \times 10^8$ Ω·cm and less than that of said main layer and wherein said sublayer is composed of polymer containing phosphorus compounds, alkali metal compounds, and at least one species of metal compounds selected from the group consisting of magnesium compounds, manganese compounds, zinc compounds and calcium compounds, the amount of said compounds being determined to satisfy the following formula $$M + (A/2) - P \geq 0.5$$

wherein
M is the total number of moles of magnesium compounds, manganese compounds, zinc compounds or calcium compounds contained in $10^6$ g of said polyester;
A is the number of moles of alkali metal compounds contained in $10^6$ of said polyester;
P is the number of moles of phosphorus compounds contained in $10^6$ g of said polyester;
the amount of compounds determined by said formula contained in polyester constituting said sublayer is greater than that amount in polyester constituting said main layer, and the thickness of said sublayer is from 1/200 to 4/10 of the overall thickness of said composite film.

4. The composite polyester film according to claim 1 or 3 wherein from 0.001 to 0.5% by weight of inactive particles having an average particle diameter of from 30 nm to 2.0 μm are contained in the polyester constituting said sublayer.

5. The composite polyester film of claim 4 further comprising a second sublayer, said sublayer being on respective surfaces of said main layer, wherein from 0.001–0.5% by weight of inactive particles having an average particle diameter of from 30 nm to 2.0 μm are contained in said polyester constituting said second sublayer.

6. The composite polyester film according to claim 1 or 3 wherein from 1.0 to 20% by weight of inactive particles having an average particle diameter of 30 nm to 1.0 μm are contained in the polyester constituting said sublayer.

7. The composite polyester film of claim 6 further comprising a second sublayer, said sublayers being on respective surfaces of said main layer, wherein from 1.0–20% by weight of inactive particles having an average particle diameter of 30 nm to 1.0 μm are contained in said polyester constituting said second sublayer.

8. The composite polyester film of claim 3 further comprising a second sublayer, said sublayers being on respective surfaces of said main layer, wherein the specific resistance in a melt state of the polyester constituting said second sublayer is less than $5 \times 10^8$ Ω·cm and less than that of said main layer and wherein said second sublayer is composed of polymer containing phosphorus compounds, alkali metal compounds, and at least one species of metal compound selected from the group consisting of magnesium compounds, manganese compounds, zinc compounds and calcium compounds, the amount of said compounds being determined to satisfy said general formula, wherein the amount of compounds determined by said general formula contained in polyester constituting said second sublayer is greater than that amount in polyester constituting said main layer, and the thickness of each of said sublayers is from 1/200–4/10 of the overall thickness of said composite film.

9. A method of preparing a composite polyester film comprising the steps of determining the melt state specific resistance of a polyester (a); determining the melt state specific resistance of a polyester (b); coextruding the polyesters (a) and (b) wherein said polyester (a) has a specific resistance in a melt state of less than $5 \times 10^8$ Ω·cm and wherein said polyester (b) has a greater specific resistance in a melt state than that of said polyester (a) and forming a melt-extruded unstretched sheet having a main layer and at least a sublayer at a thickness wherein the sublayer composed of said polyester (a) is from 1/200 to 4/10 of the overall thickness of the composite film; electrostatically adhering said melt-extruded unstretched sheet to a rotating quenching drum; and quench-solidifying said sheet.

10. A method of preparing a composite polyester film comprising the steps of coextruding polyesters (a) and (b) to form a melt extruded sheet having a main layer composed of aid polyester (b) and at least a sublayer wherein the sublayer has a thickness of 1/200 to 4/10 of the overall thickness of said composite film, and is formed of a polyester (a) having a specific resistance in a melt state less than $5 \times 10^8$ Ω·cm and containing phosphorus compounds, alkali metal compounds, and at least one species of metal compounds selected from the group consisting of magnesium compounds, manganese compounds, zinc compounds and calcium compounds, a compounding step including mixing said metal compounds in amounts satisfying the general formula $$M+(A/2)-P \geq 0.5$$

wherein
M is the total number of moles of one or more compounds selected from the group consisting of magnesium compounds, manganese compounds, zinc compounds and calcium compounds contained in $10^6$ g of said polyester;
A is the number of moles of alkali metal compounds contained in $10^6$ g of said polyester;
P is the number of moles of phosphorus compounds contained in $10^6$ g of said polyester,
said polyester (b) being less than the polyester (a) in terms of equation $M+(A/2)-P$; adhering said melt-extruded unstretched sheet to a rotating quenching drum electrostatically; and quench-solidifying said sheet.

11. The method of preparing said composite polyester film according to claim 9 or 10 wherein said polyester comprising the sublayer which constitutes said composite unstretched sheet is adhered to the rotating quenching drum.

12. A method of preparing a composite polyester film comprising the steps of
determining the melt state specific resistance of a polyester (a);
determining the melt state specific resistance of a polyester (b);
determining the melt state specific resistance of a polyester (c);
coextruding the polyesters (a), (b) and (c) wherein said polyesters (a) and (c) have a specific resistance in a melt state of less than $5 \times 10^8$ Ω·cm and wherein said polyester (b) has a greater specific resistance in a melt state than that of said polyesters (a) and (c) and forming a melt extruded unstretched sheet having a main layer, a first sublayer, and a second sublayer at a thickness wherein each of the first sublayer composed of said polyester (a) and the second sublayer composed of said polyester (c) is from 1/200–4/10 of the overall thickness of the composite film;
electrostaically adhering said melt-extruded unstretched sheet to a rotating quenching drum; and
quench solidifying said sheet.

13. A method of preparing a composite film comprising the steps coextruding polyesters (a), (b) and (c) to form a melt extruded sheet having a main layer composed of said polyester (b), a first sublayer composed of said polyester (a) wherein the first sublayer has a thickness of 1/200 to 4/10 of the overall thickness of said composite film, and a second sublayer composed of said polyester (c), said polyesters (a) and (c) each having a specific resistance of the polymer in a melt state less than $5 \times 10^8$ Ω·cm and less than that of said polyester (b) and containing phosphorus compounds, alkali metal compounds, and at least one species of metal compounds selected from the group consisting of magnesium compounds, manganese compounds, zinc compounds and calcium compounds, the compounding step including mixing said metal compounds in amounts satisfying the general formula:

$$M+(A/2)-P \geq 0.5$$

wherein
M is the total number of moles of one or more compounds selected from the group consisting of magnesium compounds, manganese compounds, zinc compounds and calcium compounds contained in $10^6$ g of said polyester;
A is the number of moles of alkali metal compounds contained in $10^6$ g of said polyester;
P is the number of moles of phosphorus compounds contained in $10^6$ g of said polyester,
said polyester (b) having less than polyester (a) or (c) in terms of equation $M+(A/2)-P$; adhering said melt-extruded unstretched sheet to a rotating quenching drum electrostatically; and quench-solidifying said sheet.

14. The method of preparing a composite polyester film according to either of claims 12 or 13 wherein said polyester comprising said second sublayer which constitutes said composite unstretched sheet is adhered to the rotating quenching drum.

* * * * *

UNITED STATES PATENT AND TRADEMARK OFFICE
CERTIFICATE OF CORRECTION

PATENT NO. : 5,256,471

DATED : October 26, 1993

INVENTOR(S) : Tohru Morita, Ahihiko Nagahama, Toshiaki Ueda, Masaaki Ono

It is certified that error appears in the above-indentified patent and that said Letters Patent is hereby corrected as shown below:

Column 2, line 23, please change "5x108$\Omega \cdot$cm" to --5x10$^8 \Omega \cdot$cm--.

Column 4, at about line 25, please change "(a/2)" to --(A/2)--.

Column 11, line 7, please change "(A=098mol/10$^6$g)" to --(A=0.98mol/10$^6$g)--.

Column 16, line 9, please change "sublayer", second occurrence, to--sublayers--; and
line 63, please change "aid" to --said--.

Signed and Sealed this

Twenty-sixth Day of April, 1994

Attest:

BRUCE LEHMAN

*Attesting Officer*  *Commissioner of Patents and Trademarks*